July 22, 1969     E. G. MARCMANN     3,456,835
THERMALLY INSULATED TANK STRUCTURE
Filed April 12, 1968                                                          8 Sheets-Sheet 1

INVENTOR
EMIL MARCMANN
BY
ATTORNEY

July 22, 1969 E. G. MARCMANN 3,456,835
THERMALLY INSULATED TANK STRUCTURE
Filed April 12, 1968 8 Sheets-Sheet 2

INVENTOR
EMIL MARCMANN
BY
ATTORNEY

July 22, 1969  E. G. MARCMANN  3,456,835
THERMALLY INSULATED TANK STRUCTURE
Filed April 12, 1968  8 Sheets-Sheet 4

INVENTOR
EMIL MARCMANN
ATTORNEY

July 22, 1969  E. G. MARCMANN  3,456,835
THERMALLY INSULATED TANK STRUCTURE
Filed April 12, 1968  8 Sheets-Sheet 5

INVENTOR
EMIL MARCMANN

ATTORNEY

United States Patent Office 3,456,835
Patented July 22, 1969

3,456,835
THERMALLY INSULATED TANK STRUCTURE
Emil G. Marcmann, P.O. Box 5, Medford, N.J. 08055
Filed Apr. 12, 1968, Ser. No. 720,943
Int. Cl. B65d 25/18
U.S. Cl. 220—9    5 Claims

ABSTRACT OF THE DISCLOSURE

An insulated tank structure comprising a plurality of panels having an insulating material secured thereto which are arranged about the outside walls of a tank structure and caused to retain its position thereon by means of a novel securing means which will permit for the expansion and contraction of the securing means and panels secured thereby due to temperature changes occurring within the tank structure.

BACKGROUND OF THE INVENTION

In the petroleum and chemical industries it is customary to store liquids and the like within large tank structures which are usually installed out in the open where they are exposed to the elements, both heat and/or cold. These storage facilities usually comprise circular steel or other metallic tank structures which, by reason of being installed out in the open, must be provided with a suitable insulating material so that the products in storage within the storage tanks may be kept at the desired temperatures. In previous storage tank insulation, it has been customary to apply some type of an insulating material exteriorly of the metallic tank structure and to securely bind the same thereto by the use of an adhesive or by circumferential bands extending completely around the outside diameter of the tank and secured in a fixed position. The manner of securing insulating panels to the exterior of a metallic storage tank is objectionable for the reason that the tank structure is oftentimes exposed to varying temperature gradients with the result that the metallic shell is caused to expand and contract due to such temperature variations. Obviously, if an insulating material has been applied to the exterior surface of such a tank as by adhesively securing the same thereto, the adhesive bond between the metallic shell and insulating material is caused to be broken due to such expansion and contraction with the result that the insulating material is separated from the metallic shell with resultant loss of insulation for the tank at such spots or areas. In instances where the insulating material is secured to the tank structure as by means of exteriorly extending circumferential bands, the bands are usually set to a pretensioned force at the time of installation of the insulating material and when, by reason of differing temperature gradients, the tank walls are caused to expand and/or contract, the bands, which are usually formed of metal are incapable of further stretching to accommodate the expansion of the tank and insulating material thereon and will break or snap off thus necessitating the repair or replacement of such bands. On the other hand, where the tank structure is caused to contract, the metallic bands lose their efficiency as holding means for the insulating material since the bands are not exposed to the temperatures within the tank which causes such contraction of the metallic tank.

In recent years, attempts have been made to insulate the exterior of storage tanks by using various type foamed resinous materials but, here again, difficulties have been encountered in properly maintaining such insulating material on a structure to be insulated.

Also, various means have been employed for securing a foamed backed panel to the exterior surface of a storage tank but such securing means did not allow for the expansion and contraction of the storage tank by reason of the tank being exposed to varying temperature gradients with the result that such insulating material has not proven to be entirely satisfactory. The previous attempts to insulate a storage tank with a foamed insulating material encountered considerable difficulties as no provision was provided for the creeping or expansion of the foamed insulating material and quite frequently the foamed material tended to buckle or otherwise deform the sheet supporting the same on the exterior of the tank thus necessitating the replacement of the insulating material.

With the above in mind, it is therefore the main object of the invention to utilize a foamed plastic material as the insulating material and to secure the same in any manner, as by adhesive and the like, to a backing sheet usually composed of a thin aluminum sheeting, and to securely fasten the same about the outer walls of a tank to be insulated by strap elements which will permit for the ready expansion and contraction of the tank structure while effectively maintaining the insulating material in face to face relation with the tank walls.

Another object of the invention is to provide for a novel support means which is adapted to be arranged in staggered vertical position on the exterior of the wall of the storage tank to be insulated and which will overlie the adjacent edges of sheeting having the insulating material bonded thereto so as to prevent the entry of rain water and the like between the support and sheeting.

Another object of the invention is to provide slots at opposite ends of the supports extending vertically between the sheeting so as to form an interlock between the top and bottom edges of each adjacent sheeting as well as to accommodate the top and bottom edges of the circumferential band which encircles the tank for retaining the sheeting in proper position thereon.

Another object of the present invention is to provide a novel means for securing the ends of a circumferentially extending band about a tank structure which will permit for the expansion and contraction of the tank structure while still effectively maintaining the insulating material in close contact with the exterior walls of the tank being insulated.

Still another object of the invention is to provide for a simplified manner of maintaining the insulating panels in close proximity to the exterior walls of a tank to be insulated to thus provide the workmen applying the insulating sheeting with a means for supporting an insulating sheet in proper position prior to securing the same to a tank.

Other objects and advantages of the invention will be pointed out specifically or will become apparent from the following description when it is considered in conjunction with the appended claims and the accompanying drawings.

DESCRIPTION OF THE PREFERRED EMBODIMENTS

Figure 1:
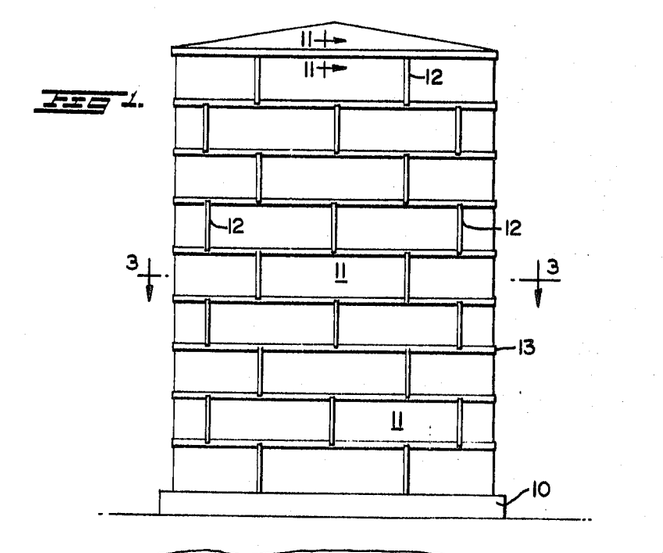
FIGURE 1 is a side elevation illustrating an embodiment of the invention in the form of an insulated storage tank of generally cylindrical configration disposed in a vertical position.
Figure 2:
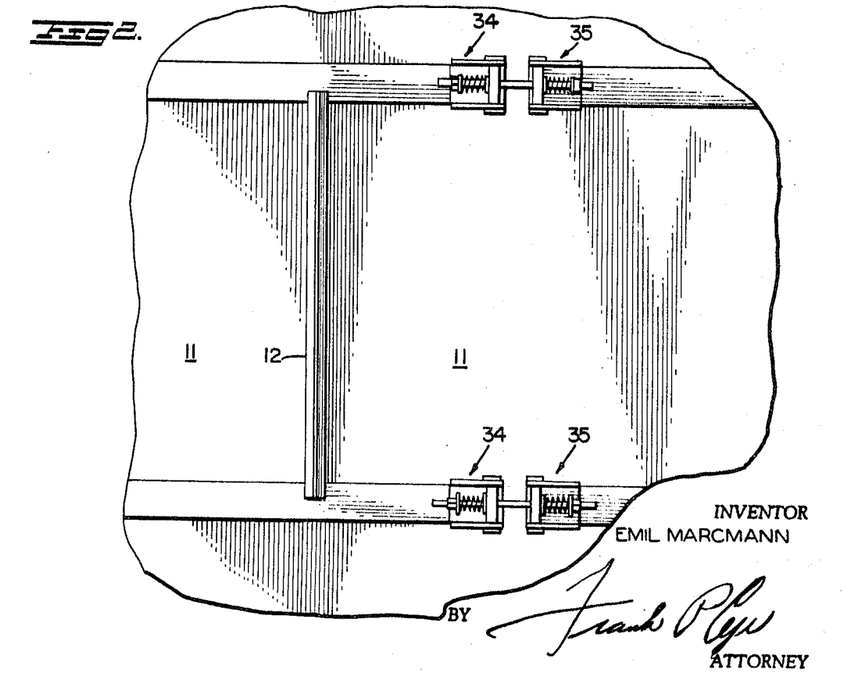
FIGURE 2 is an enlarged fragmentary elevational view of a portion of the insulating panels shown in FIGURE 1 and also showing the clamp securing means.
Figure 3:
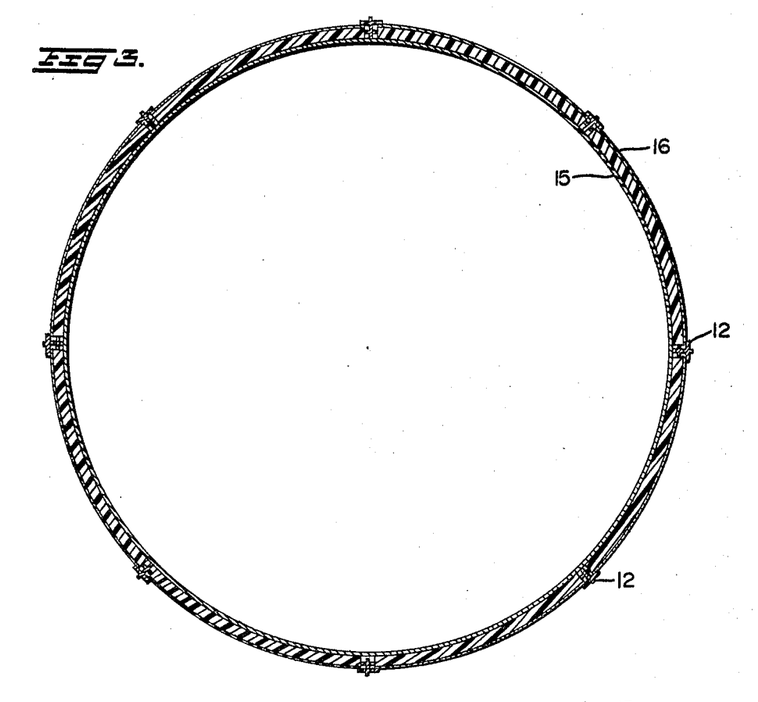
FIGURE 3 is a horizontal sectional view taken along the lines 3—3 of FIGURE 1, looking in the direction of the arrows.

Referring now to the drawings, there is shown at FIGURE 1 thereof a storage tank which is usually in the nature of a tank of about 60 feet in diameter and about 90 feet high. The storage tank is normally set on a concrete base shown generally at 10 and it is pointed out that the tank size set forth above is given as an example of size only and the invention shown herein, of course, is not to be limited to any size tank or any particular tank construction. The storage tank shown in FIGURE 1 is usually constructed of a number of prefabricated metallic panels suitably secured to one another to form a completed enclosure. Tanks of this general nature are normally employed for the storage of liquids for subsequent redistribution. While in storage the liquids within the tank are maintained within given temperature ranges depending upon the nature of the liquids being stored and such tanks are usually provided interiorly thereof with heating or cooling means for maintaining the stored liquids within the desired temperature ranges. As can be appreciated, such tanks must of necessity be provided with an exterior layer of insulating material so as to minimize any heat loss.

Again referring to FIGURE 1, there is shown therein a plurality of insulating panels 11, vertical supports 12, and circumferential bands 13. The vertical supports 12 preferably are formed of extruded aluminum and are in the nature of a modified T shape as shown more clearly at FIGURES 4, 5 and 8 of the drawings. While I have described such supports as being formed of extruded aluminum it is obvious such supports may be constructed of other metallic or plastic substances. The panels 11 are of a generally rectangular shape and comprise an outside sheet or facing 14 formed of aluminum, galvanized iron, or any other suitable material. A preformed sheet of an insulating material, preferably foamed plastic is adhesively or otherwise secured to one face of the panel 11 and is adapted to be disposed in face to face relationship with the outside wall 15 of the tank structure.

It has been found advantageous and economical to prepare the insulating panels from metallic panels cut to the desired size and applying an adhesive material on one side thereof and thereafter applying a sheet of plastic foam of the desired size to the panel and passing the laminate between a series of rollers which will press the laminate into tight engagement with one another, and, if the laminate is to be preformed to a given curvature so as to follow the contour of the tank to which it is to be applied, the roller structure can be set to impart the desired curvature to the laminate while simultaneously pressing the foamed material thereagainst.

As can be seen more clearly at FIGURES 20 and 21 of the drawings, the panel 11 is generally rectangular in shape and when the foamed plastic sheet is laminated thereto, the upper edge of the foamed plastic 16 is flush with the top edge 17 of the outside sheet or facing 14 whereas the bottom 18 and side edges 19 of the foamed plastic terminate short of the bottom and side edges of the outside sheet or facing 14 for a purpose to be more fully described hereinafter.

Figure 8:
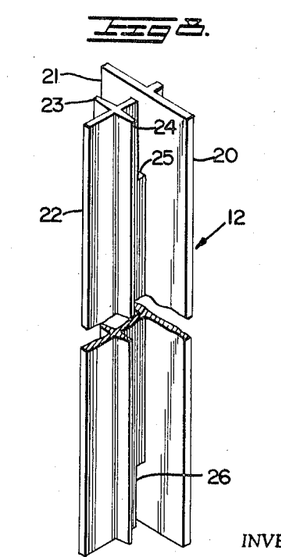
FIGURE 8 is a perspective view of one of the vertical support elements.

Referring now to FIGURE 8 of the drawings, there is shown therein one of the vertical members or supports 12 which are adapted to be arranged between the side edges 19 of next adjoining panels 11. The supports 12 are designed to be arranged in staggered relationship as shown in FIGURE 1 of the drawings and comprise a generally T-shaped extrusion having flanges 20 and 21 extending outwardly from the center piece 22 of the support. Formed intermediate the centerpiece 22 are a pair of projections 23 and 24 which are preferably formed integral with the centerpiece 22. As can be seen, both the flanges 20 and 21 and projections 23 and 24 extend the full length of the vertical support 12 and as best seen in FIGURE 8 of the drawings, slots 25 and 26 are formed at the upper and lower ends of the supports for a purpose to be more fully described hereinafter.

As can be appreciated, the panels 11 are arranged about the outer wall 15 of the tank structure and are so positioned thereabout so as to stagger the meeting edges of the panels and thus likewise stagger the position of the vertical supports as shown in FIGURE 1 of the drawings.

Figure 7:
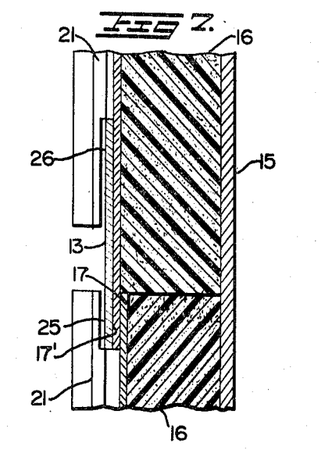
FIGURE 7 is a sectional view similar to FIGURE 6 showing in full lines the parts broken away in FIGURE 6.

Referring now to FIGURE 7 of the drawings, there is shown therein the manner in which an overlapping arrangement is provided between the bottom edge 17' of one panel and the upper edge 17 of the next succeeding panel. As set forth previously, particularly with respect to FIGURES 20 and 21, the plastic foam does not extend to the edge of the outside sheet or facing 14 which permits for the overlapping of that portion of the facing with the top edge 17 of the next succeeding panel. Thus, it will be seen that as the panels are arranged exteriorly of a tank structure, the top edge 17 of the lowermost panel will be overlapped by the bottom edge 17' of the next adjacent panel and when thus assembled, the plastic foam sheets 16 abut one another thereby completely covering the outside wall 15 at the juncture between the top and bottom edges of adjacent panels. Again, referring to FIGURE 7 of the drawings, it will be seen that the lower edge 17' of sheet 14 extends within the slot 25 formed in the upper end of the support 12 to enable the upper and lower edges of the panels to overlap and to thus provide for a connection between adjacent panels which will exclude rain or any other extraneous matter from between the panels and likewise from into the foamed plastic. Once the panels have been joined in overlapped relation, as set forth above, a circumferential band 13 is caused to extend within the slots 25 and 26 and following the application of a row of panels about the exterior of the tank structure, in the manner aforesaid, the band ends are then caused to be fastened to a suitable fastener means in a manner to be described more fully hereinafter.

Figure 4:
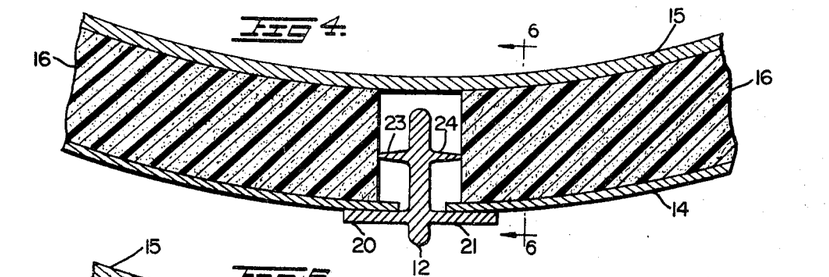
FIGURE 4 is an enlarged detailed fragmentary sectional view of a portion of FIGURE 3.
Figure 5:
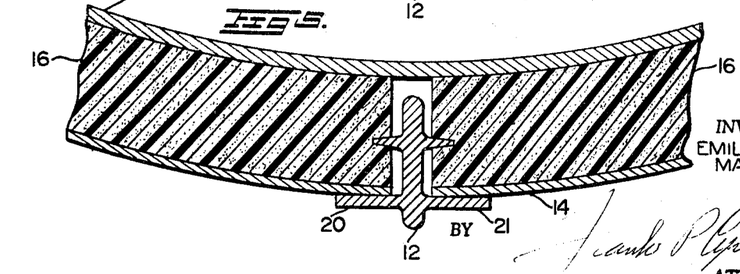
FIGURE 5 is a view similar to FIGURE 4 and shows the insulating media in an expanded condition.
Figure 6:
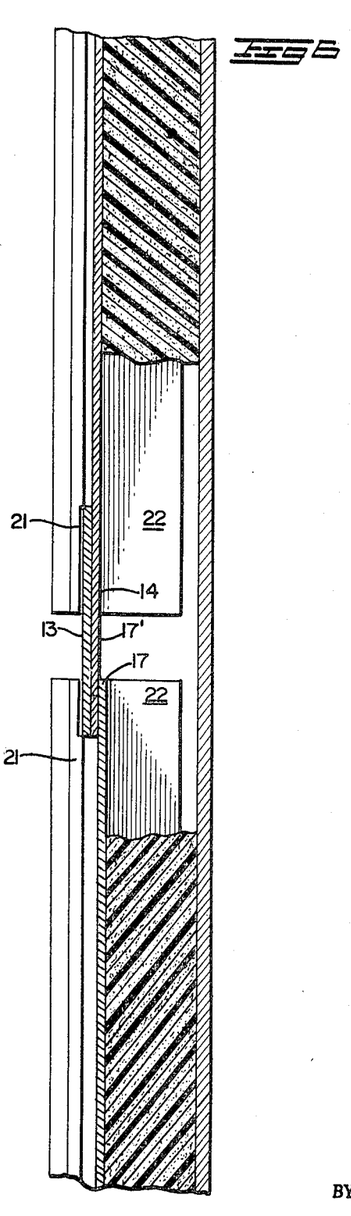
FIGURE 6 is a detailed vertical sectional view taken on the line 6—6 of FIGURE 4, looking in the direction of the arrows with parts broken away.

Referring now to FIGURES 4 and 5 of the drawings, there is shown therein the side edge connection of adjacent panels. As clearly shown, support 12 is adapted to be disposed between the lateral side edges of the adjacent panels with the flanges 20 and 21 overlapping the side edges 19'. Obviously, this type of connection insures the exclusion of extraneous matter from the foamed plastic. The foamed plastic sheet 16 terminates short of the side edges 19' of the outside sheet or facing 14 as clearly shown in FIGURES 20 and 21. Prior to installation of the panels to the exterior wall of a storage tank, the foamed plastic sheet which has been adhesively or otherwise secured to the facing or sheet 14, terminates short of the side edges 19' for a reason to be more fully described hereinafter.

FIGURE 4 of the drawings discloses the relative positions of the vertical support 12 and the adjacent edges of the foamed plastic sheets 16 when the insulating sheets are initially applied to the exterior wall of a tank to be insulated. The plastic foamed sheet is shown to extend well within the side edges 19' of the outside sheet 14 so as to allow for the plastic foamed sheet to creep or expand when it has been subjected to the high temperatures maintained within the storage tank. Shown at FIGURE 5 are the adjacent side edges of the sheets of foamed plastic material which has expanded after the same has been exposed to elevated temperatures. It will be noted that the foamed plastic sheets have engaged with the projections 23 and 24, embedding the same within the foamed plastic sheets so as to further stabilize the vertical supports 12 in their assembly with the other components employed herein for erecting an insulating medium about the exterior surface of a storage tank. Thus it will be seen that provision is hereby made for the expansion of the foamed plastic material without causing any undue stresses on the sheeting 14 and without disturbing the placement of the vertical supports 12.

Figure 9:
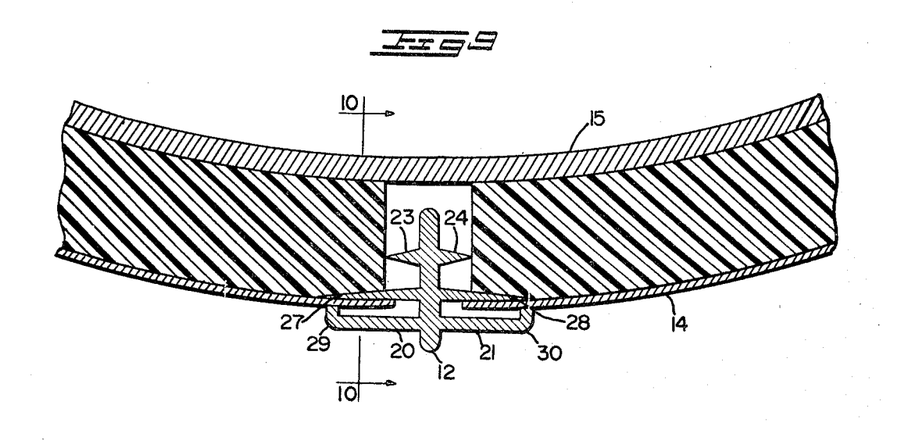
FIGURE 9 is an enlarged detailed fragmentary sectional view of a modified form of the vertical support elements.
Figures 10, 20, 21:
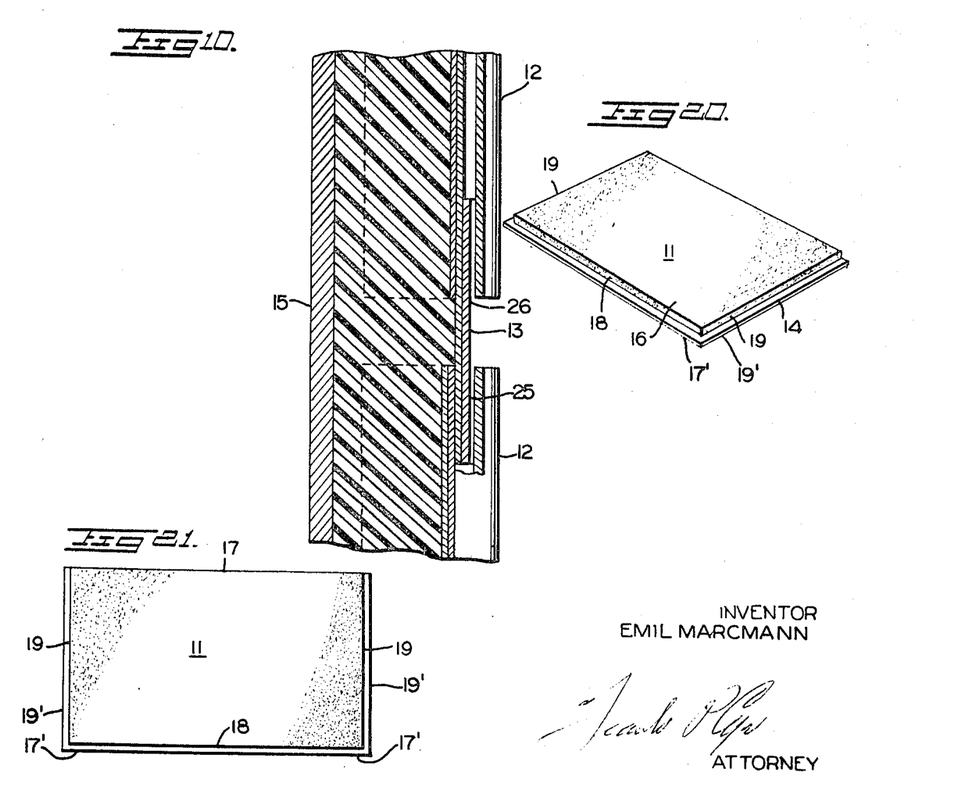
FIGURE 10 is a detailed vertical sectional view taken along the lines 10—10 of FIGURE 9 looking in the direction of the arrows.
FIGURE 20 is a perspective view of one of the insulating panels employed with the present invention.
FIGURE 21 is a top plan view of the insulating panel.

FIGURES 9 and 10 of the drawings disclose a modified form of the vertical supports 12 employed in erecting the insulation panels constructed in the manner previously described. This modification of the support is designed to be employed and to function in the same manner as previously described except that in this modification, a pair of lips 27 and 28 are formed integral with the support 12 and are adapted to cooperate with a pair of inturned ears 29 and 30 to house therebetween the opposite edges of the facing 14 thereby preventing separation of the support 12 from the facing 14 thus insuring the non-entry of rain water or any other extraneous matter within this connection between the panels. As described with reference to FIGURE 4 of the drawings, provision is made for the creeping or expansion of the foamed plastic sheet when subjected to elevated temperatures from within the storage tank.

Referring now more particularly to FIGURE 10 of the drawings, the same shows the supports 12 having slots 25 and 26 formed at the upper and lower edges thereof which are adapted to receive therein the overlapping edge of the next upper adjacent insulating sheet and the circumferential band 13 in the same manner and for the same purpose as has been described with respect to FIGURE 7 of the drawings.

Figure 11:
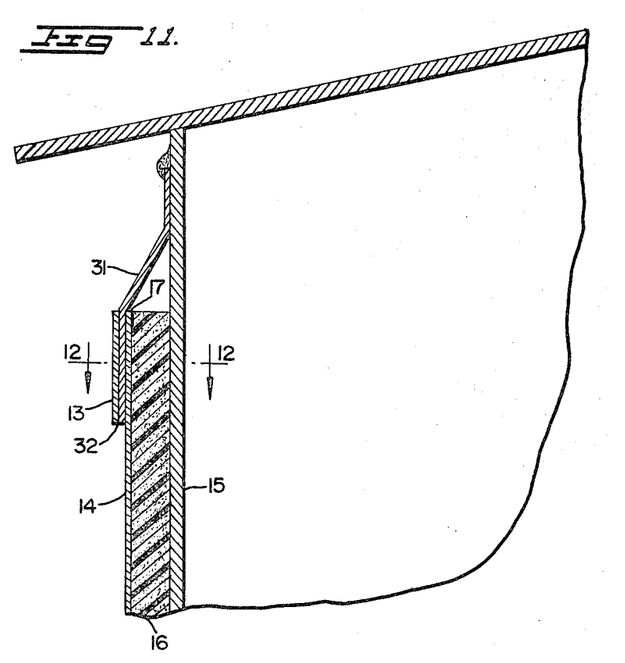
FIGURE 11 is an enlarged fragmentary sectional view taken along the line 11—11 of FIGURE 1 showing the structure for sealing the insulating panels adjacent the tank roof.
Figure 12:
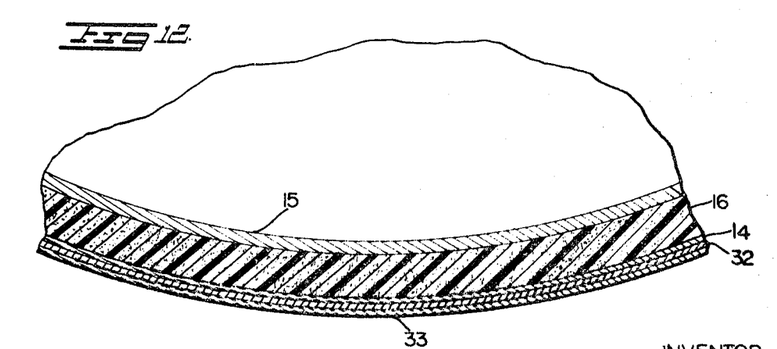
FIGURE 12 is a horizontal vertical fragmentary sectional view taken along the line 12—12 of FIGURE 11, looking in the direction of the arrows.

FIGURES 11 and 12 disclose the manner of excluding rain water and/or any other extraneous matter from the foamed plastic material in contact with the exterior wall of a storage tank. Shown at FIGURE 11 is a typical slanted roof type storage tank with the walls of the tank secured thereto in any known manner. The foamed plastic sheet 16 and outside sheet or facing 14 terminate short of the upper edge of the tank structure. A plate 31 is secured as by welding and the like to the exterior wall 15 of the tank and extends completely around the tank. The lower edge 32 of the plate 31 extends over the top edge 17 of facing 14. A circumferential band 33 similar to band 13 previously described may be employed for retaining the lower edge 32 of plate 31 in tight engagement with the facing 14.

Figure 13:
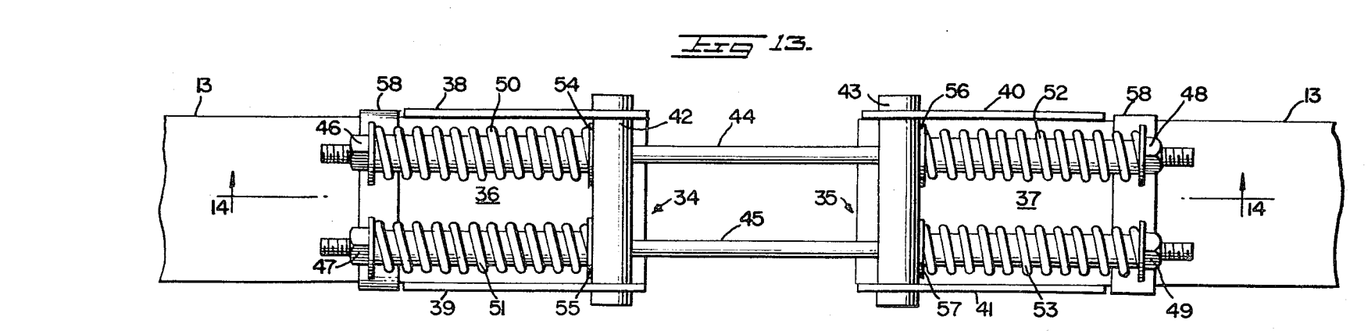
FIGURE 13 is an elevational view of the preferred form of band securing and tensioning means.
Figure 14:
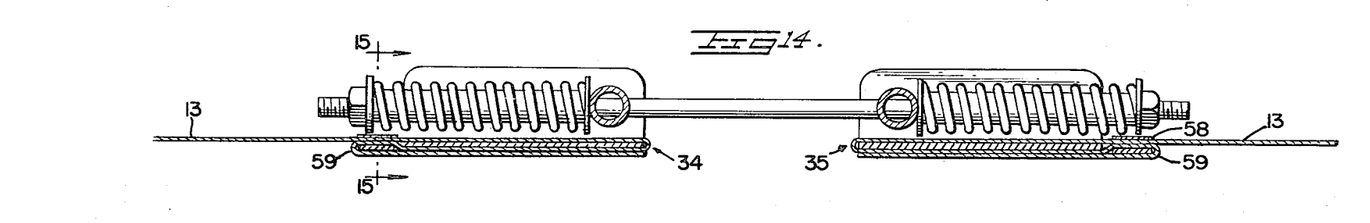
FIGURE 14 is a horizontal sectional view taken along the line 14—14 of FIGURE 13, looking in the direction of the arrows.
Figure 15:
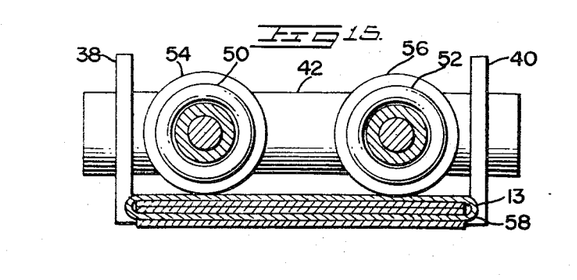
FIGURE 15 is an enlarged detailed vertical sectional view taken along the line 15—15 of FIGURE 14, looking in the direction of the arrows.

FIGURES 13, 14 and 15 disclose one form of a clamp which is designed to secure the ends of the bands 13 after the same have been applied to the exterior of the insulating panels in the manner aforesaid. The clamp comprises a pair of like formed clamping members 34 and 35, each comprising a base member 36 and 37 having pairs of upstanding ears 38, 39, 40 and 41. Mounted between ears 38 and 39 and 40 and 41 are tubular members 42 and 43. A pair of rods 44 and 45 extend through openings formed in tubular members 42 and 43 and the outer ends thereof are threaded to receive nuts 46, 47, 48 and 49. Springs 50, 51, 52 and 53 are slidably mounted on rods 44 and 45 and washers 54, 55, 56 and 57 are interposed between the springs and the tubular members 42 and 43. Thus it will be seen that the clamping members are capable of adjustment to lengthen or shorten the clamp by the mere manipulation of the aforesaid nuts on the aforementioned bolts. The ends of band 13 are secured to the clamping members by first threading the same through a sleeve-like member 58 and thence to the forward edge of the clamp where the band is reversely bent and again threaded through the sleeve-like member 58. Following this, the loose end of the band can again be reversely bent as at 59 to complete the connection.

Figure 16:
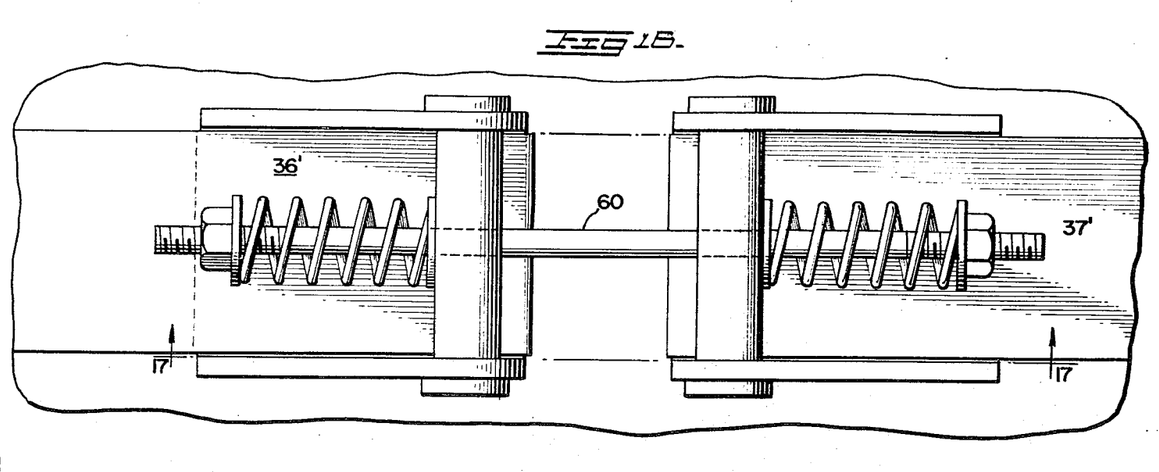
FIGURE 16 is an elevational view of a modified form of a band securing and tensioning means.
Figure 17:
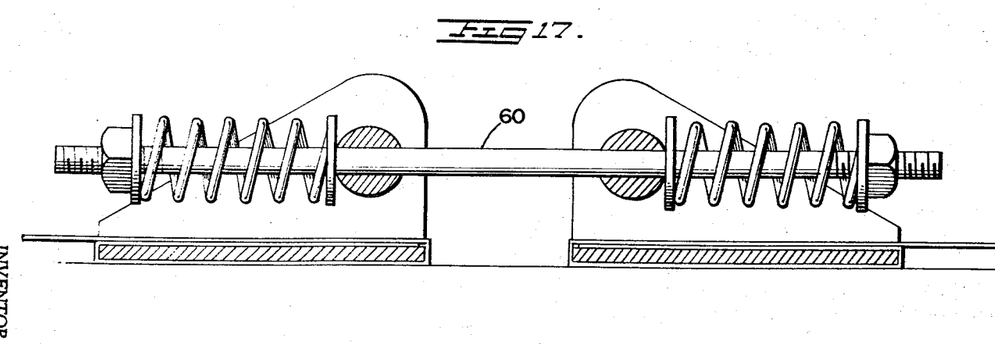
FIGURE 17 is a horizontal detailed sectional view taken along the line 17—17 of FIGURE 16.

FIGURES 16 and 17 of the drawings disclose a modified type of clamping member which can be employed for securing the band ends together. In this modification of the invention, a single rod 60 is employed in lieu of the pair of rods employed in the modification shown in FIGURES 13 and 14 of the drawings. The clamp shown in FIGURES 16 and 17 is designed to operate in the same manner as the clamp previously described except that in this instance, instead of using a sleeve-like member through which the band ends are threaded, the band ends are merely wound about the clamp bases 36' and 37', as clearly shown in FIGURE 17.

Figures 18, 19:
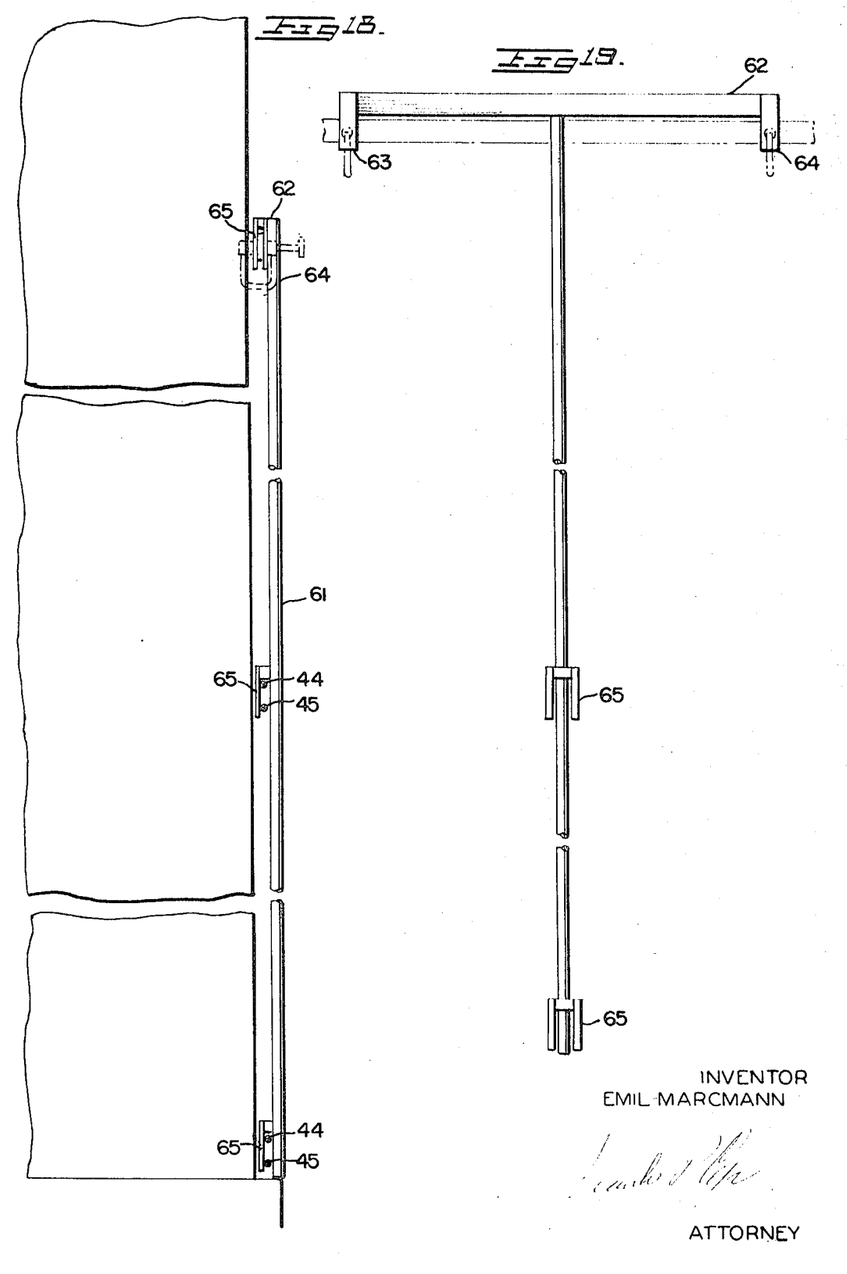
FIGURE 18 is a side elevational view of a work holder employed during installation of the insulating panels.
FIGURE 19 is a front elevational view of the work holder shown in FIGURE 18.

Referring now to FIGURES 18 and 19, there is shown a vertical standard 61 having a cross piece 62 secured thereto in any known manner. C-clamps 63 and 64 are arranged on the cross piece 62 and rod engaging fingers 65 are arranged at spaced intervals on the vertical support.

There will now be described the manner of erecting the insulating panels to the exterior wall of a storage tank or the like. As can be appreciated, the panels are installed beginning with the lowermost row of panels at ground level and continuing upwardly with such rows until the tank has been completely covered with the insulating panels. Once the first or lowermost row of panels has been placed about the tank structure with the vertical supports placed between the side edges of the adjacent panels and with the panels in overlapped relation as described previously, a circumferential band 13 is loosely mounted about the tank and panels and engages in the slots formed in the upper and lower ends of the vertical supports. Following this, the next row of panels are mounted on top of the first row of panels with the bottom edges of the sheets disposed behind the loosely mounted band and lying in overlapped relation with respect to the top edges of the preceding row of panels. After this has been accomplished, the band ends are secured to the clamping members and tension can then be applied to the bands by adjusting the clamping members in the manner described hereinabove. After the first few rows of panels have been applied in the manner aforesaid, it then becomes necessary that some means be employed for maintaining the band in a position where the same can be easily handled by the workmen installing the panels. For this purpose, I have provided the vertical standard with the cross piece and rod engaging fingers. As the installation progresses upwardly, the band ends may be engaged in clamps 63 and 64 and the band held at the desired elevation by engaging the clamping rods of the clamps with the rod engaging fingers on the vertical support. This manner of handling the band is repeated as each row of panels is installed.

As can be appreciated, I have provided herein an improved means of overlapping next adjacent edges of insulating panels and likewise have devised an improved vertical support which is mounted between the side edges of next adjacent insulating panels for effectively securing the assembly including the circumferential band which extends between each row of panels and overlies the overlapped panel edges.

Also, it should be pointed out that the improved means of securing the band ends together is one which possesses considerable advantages over what has been done previously. Of necessity circumferential bands must be applied to most installations of this type so as to maintain the insulating panels in proper position on a tank to be insulated. However, such bands are subjected to great stresses due to expansion of the tank structure caused by varying elevated temperatures within the tank proper and unless provision is made for the ready expansion of such bands the same are apt to break thus necessitating a replacement of such bands.

It should also be pointed out that the expansion and contraction of a metallic tank structure can easily be calculated when the temperatures to which the tank is to be exposed are known. Thus, once the amount of expansion and contraction of the tank has been determined, the workmen applying the insulating panels to a structure can easily determine the amount of tension to apply to the clamping members so as to allow such expansion and contraction of the band thereby avoiding the breaking off of the band for these reasons.

While I have shown and described the invention as being utilized for insulating a storage tank of a circular formation, it is obvious that the manner of applying insulating panels such as herein described can be equally applied to structures other than cylindrical structures.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and sub-combinations.

As many possible embodiments may be made of the invention without departing from the scope thereof, it is to be understood that all matter herein set forth or shown in the accompanying drawings is to be interpreted as illustrative and not in limited sense.

The invention having been described, what is claimed is:

1. A thermally insulated structure comprising a vertically extending cylindrical tank wall, a plurality of elongated circumferentially spaced vertically extending supports disposed about the outer face of said tank wall, circumferential bands engaging with said supports and preformed insulating panels disposed between and engaged by said vertical supports and said circumferential bands, said preformed panels being arranged in superposed horizontal rows around said tank wall and provided with bottom edge flanges thereon overlapping the upper edges of the next vertically underlying row of panels, said vertical supports having slots formed at the top and bottom ends thereof for the reception of said overlapping bottom edge flanges of said panels and said circumferential bands and spring biased means retaining said bands in tensioned overlapping relation with said upper edges and bottom edge flanges of the superposed rows of panels.

2. The structure recited in claim 1 wherein said circumferential band will expand and contract in accordance with the degree of expansion and contraction occurring in said insulated structure.

3. The structure recited in claim 1 wherein said preformed insulating panels comprise a foamed plastic material bonded to a facing sheet.

4. The structure recited in claim 3 wherein said vertical supports include a longitudinally extending center piece with its major plane disposed radially of the tank and having insulation engaging projections formed thereon.

5. The structure recited in claim 3 wherein said insulating panels comprise a facing sheet having a plastic foam secured thereto, said plastic foam extending flush with the top edge of said sheet whereas said plastic foam is disposed inwardly of the remaining edges of said sheet.

References Cited

UNITED STATES PATENTS

| | | | |
|---|---|---|---|
| 1,675,354 | 7/1928 | Kemper | 220—10 |
| 1,888,039 | 11/1932 | Huff. | |
| 2,323,297 | 7/1943 | Collins. | |
| 2,691,458 | 10/1954 | Dinwiddie. | |
| 3,010,599 | 11/1961 | Haines et al. | |

JOSEPH R. LECLAIR, Primary Examiner

J. R. GARRETT, Assistant Examiner

U.S. Cl. X.R.

52—248, 249